Feb. 4, 1941.   G. H. FAHRENBRUCH   2,230,535
COTTER KEY SPREADER
Filed March 12, 1940
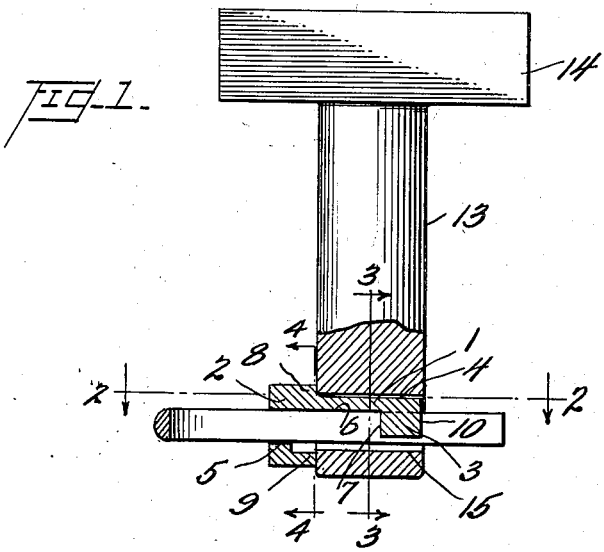
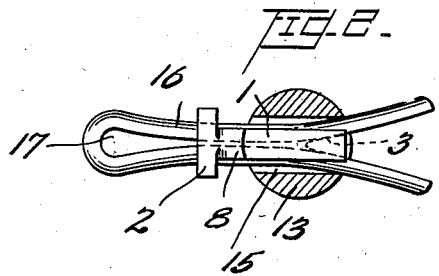
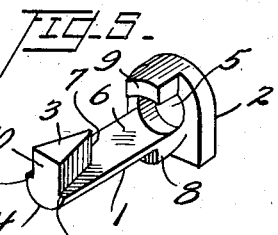
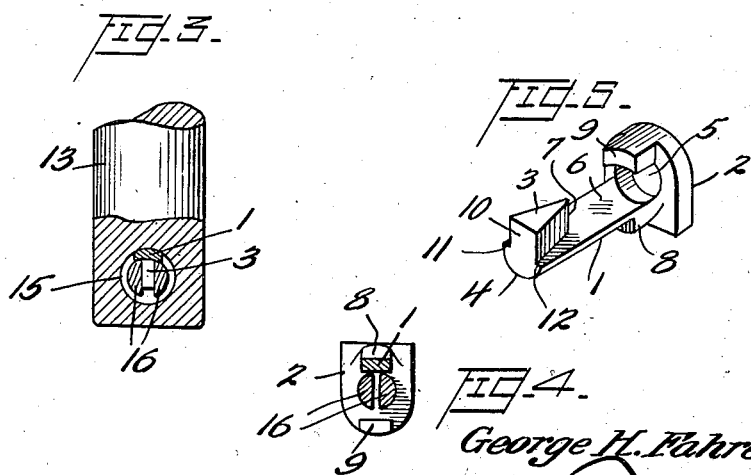
Inventor
George H. Fahrenbruch,
By Parker Cook,
Attorney Patented Feb. 4, 1941

2,230,535

UNITED STATES PATENT OFFICE 2,230,535

COTTER KEY SPREADER

George H. Fahrenbruch, Sheridan, Wyo.

Application March 12, 1940, Serial No. 323,610

5 Claims. (Cl. 85—8.5)

My invention relates to new and useful improvements in spreaders for cotter keys, and has for an object to provide a spreader that may be conveniently and quickly inserted in the hole of a brake pin, draft pin, and all other forms of relatively large pins in which there is provided an opening for a cotter key.

As is well known, there are many instances where a relatively large retaining pin is used in the railway art, such as in draft gears, brake hangers, and other similar places, where it is necessary that the pin be held as safely in place as possible, as should the pin work loose from its position, it may cause derailments or other accidents.

One of the objects of the present invention, therefore, is to provide a spreader which may, of course, be made in different sizes and may be used in pins on draft gears, brake hangers, and other places so that after the cotter key is once driven into position, it will be practically impossible for it to become dislodged unless manually pulled from its position.

A further object of the invention is to provide a spreader which may be made of different sizes and different lengths to fit in the standard size holes in the various forms of pins, so that instead of driving the cotter through the hole, the spreader and cotter are inserted in the hole and then the cotter hammered into place to thus spread the arms of the pin and thus the pin can never work from its place until forcibly extracted.

Still another object of the invention is to provide a relatively inexpensive spreader that may be readily cast or forged so that the cost of the same is relatively low.

With these and other objects in view, the invention consists in certain new and novel features and combination of parts, as will be hereinafter more fully explained and pointed out in the claims.

Referring now to the drawing showing a preferred embodiment,

Fig. 1 is a view partly in section and partly in elevation, showing my improved spreader in position in a retaining pin;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1; and

Fig. 5 is a perspective of my improved spreader.

It might be mentioned at the outset that the present invention somewhat follows the construction set forth in my Patent Number 1,231,514, granted to me on June 26, 1917, for Pin. In that instance, however, it was necessary to form a spreader in the pin itself by drilling from the opposite sides of the pin to make a passage leading into bifurcated passages.

In the present instance, I accomplish the same result, that is, spreading the arms of the key to retain the pin against loss, by a special form of spreader which may be inserted in the regulation hole of the retaining pin.

It will be understood at the outset that the retaining pins for draft gears and brake beam hangers are all of certain standard size and length and have certain size transverse openings therein. If the opening happens to be oval, it may be necessary to re-bore the hole, but in most instances, I have found that the different size spreaders, as about to be described, may be conveniently used without any work on the pin.

Referring now to the drawing, and for the moment to Fig. 5, there is shown a spreader having a somewhat elongated body portion 1, the head 2, and the wedge 3 mounted on the upper surface of the body opposite the head. The under surface of the body portion 1 may be arcuate, as at 4, to rest against the wall of the circular opening in the retaining pin. The head 2 is provided with the opening 5, the periphery of which at its bottom is flush with the upper surface 6 of the body while the wedge 3 is of such height that it is directly in front of the opening 5 and the apex of the wedge 7 will, of course, be centrally of the upper surface 6 of the body 1 and pointing toward the said opening 5.

On the under surface of the head and formed integral therewith and extending for a short distance of the body 1 is the lug 8, which is to form a stop, as will be shortly mentioned.

On the opposite side of the head, there is a further protruding lug 9, which terminates flush with the forward edge of the lug 8.

It will be noticed that the rear face 10 of the wedge is slightly less in width than the transverse width of the upper surface 6 of the body portion to thus leave two opposite ledges 11 and 12 extending along the rear of the wedge.

In Fig. 1, I have shown a retaining pin 13 with its head 14, and although I have shown the barrel unbroken throughout its length, with the exception of the opening, it will be understood that the barrel is sometimes slightly dished about the transverse opening 15. It will also be understood that the pin shown is merely illustrative, as the spreader will work with any form of retaining pin, provided the spreader is small enough to fit within the passageway in the pin.

To apply the cotter 16 and the spreader, it may best be understood by viewing Fig. 1 from a horizontal position rather than from the vertical position shown. The arms of the cotter 16 (now together) will be passed through the hole 5 of the spreader in a position so that the axis of the eye 17 of the cotter 16 will be parallel with the long dimension of the wedge.

The spreader is then placed within the opening 15, so that the lugs 8 and 9 will rest on the surface of the pin adjacent the opening 15. The rear of the cotter 16 is then hit a hard blow with a hammer to thus force the cotter along the body of the spreader and force the ends of the arms apart by sliding past the wedge member 3, as may be seen in Fig. 2.

The spread arms will now prevent the cotter from ever becoming accidentally disengaged from its spreader and the pin.

However, when it is desired to remove the cotter, a tool will be held against the head of the spreader and the cotter hammered back to its original position, after which the cotter and spreader may easily be removed by hand.

After the parts are re-assembled, the cotter or a new one may be again driven in as first explained.

From the foregoing, it will be seen that the spreader is one that will always retain the cotter against accidental disengagement, but when necessary to withdraw the cotter, it may easily be done by tapping with a hammer, as heretofore described.

It will also be seen that the spreaders may be manufactured at a very small cost and of different sizes to be used with pins having different size transverse openings.

Having thus described my invention, what I claim as new and desire to secure by Letters Patent is:

1. A spreader for cotter keys and the like including an elongated body having a transversely extending rigid head thereon, the head provided with a circular opening in alignment with said body, an upstanding wedge on the surface of said body with its apex extending toward said head, integral lugs on the inner surface of said head and adapted to seat on the pin in which the spreader is to be inserted and also space the head from said pin, and the wedge adapted to spread the outer ends of the arms of a cotter key when within said spreader and driven past said wedge.

2. A spreader for cotter keys and the like including an elongated body having a transversely extending head thereon and the head provided with an opening in alignment with said body and a portion of the walls of the said opening flush with the contiguous surface of the body portion, an upstanding wedge on the body portion with its apex extending toward the opening in the head, means on the head adapted to contact with the outer side walls of a pin in which the spreader is to be placed, and the wedge adapted to spread the arms of a cotter key when in said spreader and driven past said wedge.

3. A spreader for cotter keys and adapted to be placed within the opening of a retaining pin together with a cotter key, the spreader including a relatively narrow elongated body portion having a transverse rigid head at one end and a wedge member at the other end, the apex of the wedge facing the head, the head provided with an opening adapted to receive a cotter key, integral lugs on the under surface of the head adapted to contact the surface walls of the retaining pin about its opening to thus form a seat for the spreader, the arms of the cotter key being spread by the wedge when the cotter key is hammered to its final position, and the arms of of the cotter key adapted to be jammed between the wedge and the side walls of the opening in the retaining pin.

4. A spreader for cotter keys and the like consisting of an elongated body portion adapted to extend through the opening in a retaining pin, a transverse head provided with lugs on its under surface, the head adapted to straddle the opening in the retaining pin, the head provided with an opening to receive an unopened cotter key, a wedge portion on the elongated body portion in alignment with said opening and the wedge at its rear being less in width than the width of the body portion to provide seats for the arms of the cotter key, the arms of the cotter key adapted to be spread when hammered to its final position and thus jam the arms between the wedge and the side walls of the opening in which the spreader is placed.

5. A spreader for cotter keys and the like including an elongated body portion arcuate on its under surface and provided with an upstanding wedge on its upper surface, the rear face of the wedge being less in diameter than the width of the body portion to form seats for the cotter key, the body portion provided with a transverse head opposite the wedge and having an opening therein in alignment with said wedge, lugs on the under surface of the head adapted to rest on the outer walls of the retaining pin in which it is to be placed, and the wedge adapted to spread the arms of the cotter key outwardly when the key is driven forcibly past the sides of the said wedge.

GEORGE H. FAHRENBRUCH.